United States Patent
Seelandt et al.

[15] 3,705,711
[45] Dec. 12, 1972

[54] INTERNALLY HEATED ROTARY DRUM FURNACE WITH SMOKE ABATER

[72] Inventors: Karl H. Seelandt, Oregon; Hobart L. Wentworth, Barrington, both of Ill.

[73] Assignee: Sola Basic Industries, Inc., Milwaukee, Wis.

[22] Filed: Nov. 27, 1970

[21] Appl. No.: 93,198

[52] U.S. Cl. ................................263/32 R, 110/14
[51] Int. Cl. ..............................................F27b 7/00
[58] Field of Search ..........................110/14; 263/32

[56] References Cited

UNITED STATES PATENTS

| 3,306,237 | 2/1967 | Ransom, Jr. | 110/14 |
| 3,561,379 | 2/1971 | Polsak | 110/14 |
| 3,547,056 | 12/1970 | Niessen | 110/14 |

Primary Examiner—John J. Camby
Attorney—Smyth & Moore

[57] ABSTRACT

A cylindrical dryer drum is mounted for rotation about its longitudinal axis and has a burner at one end and an inlet for metallic scrap or swarf at the other end with the scrap being advanced longitudinally through the drum in contact with the products of combustion. One end of the dryer has a discharge chute for the scrap with both the inlet and discharge being substantially sealed against the entry of air into the drum. The products of combustion are discharged at the inlet end of the drum into a vertical stack provided with an afterburner.

14 Claims, 6 Drawing Figures

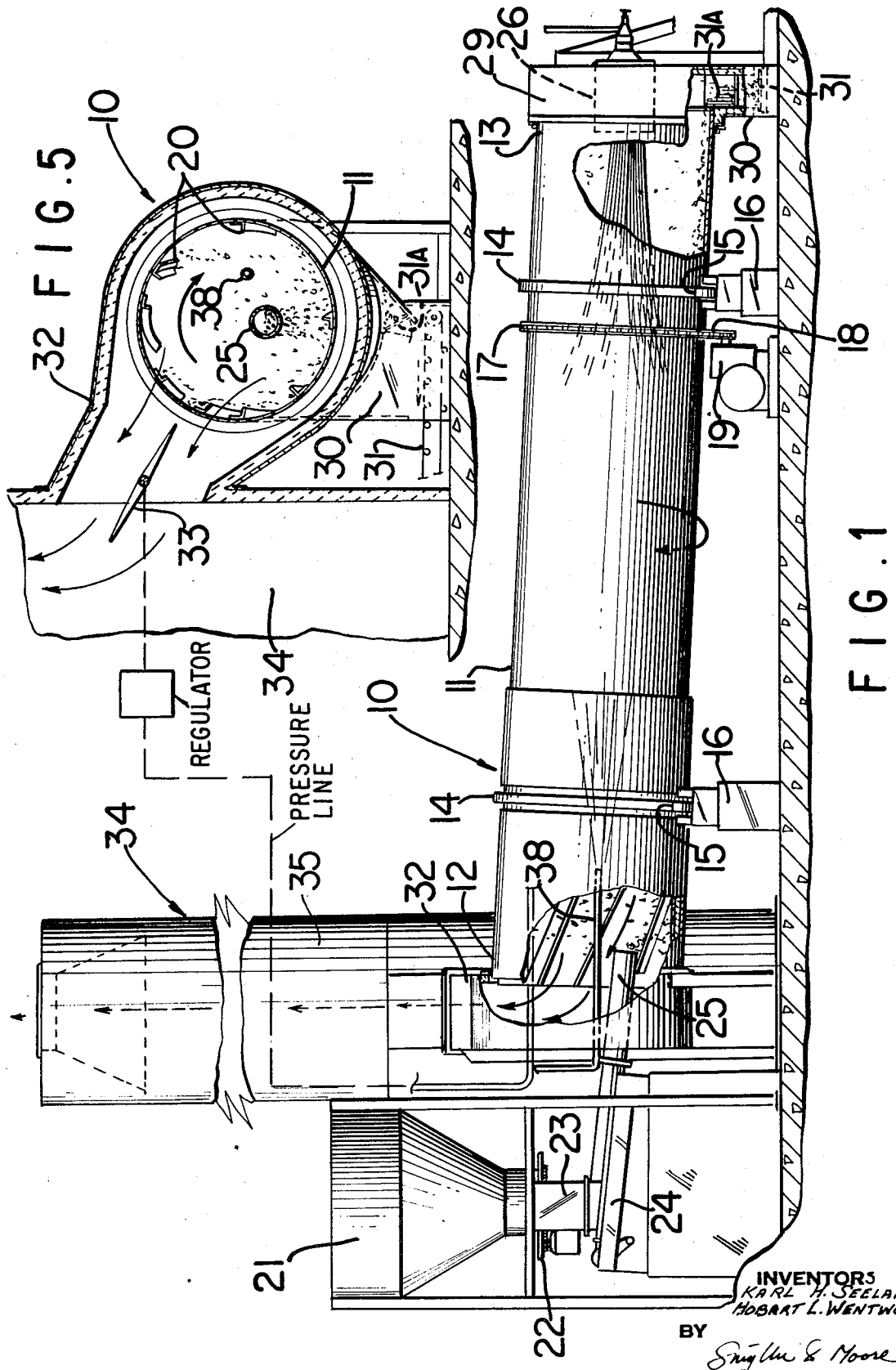

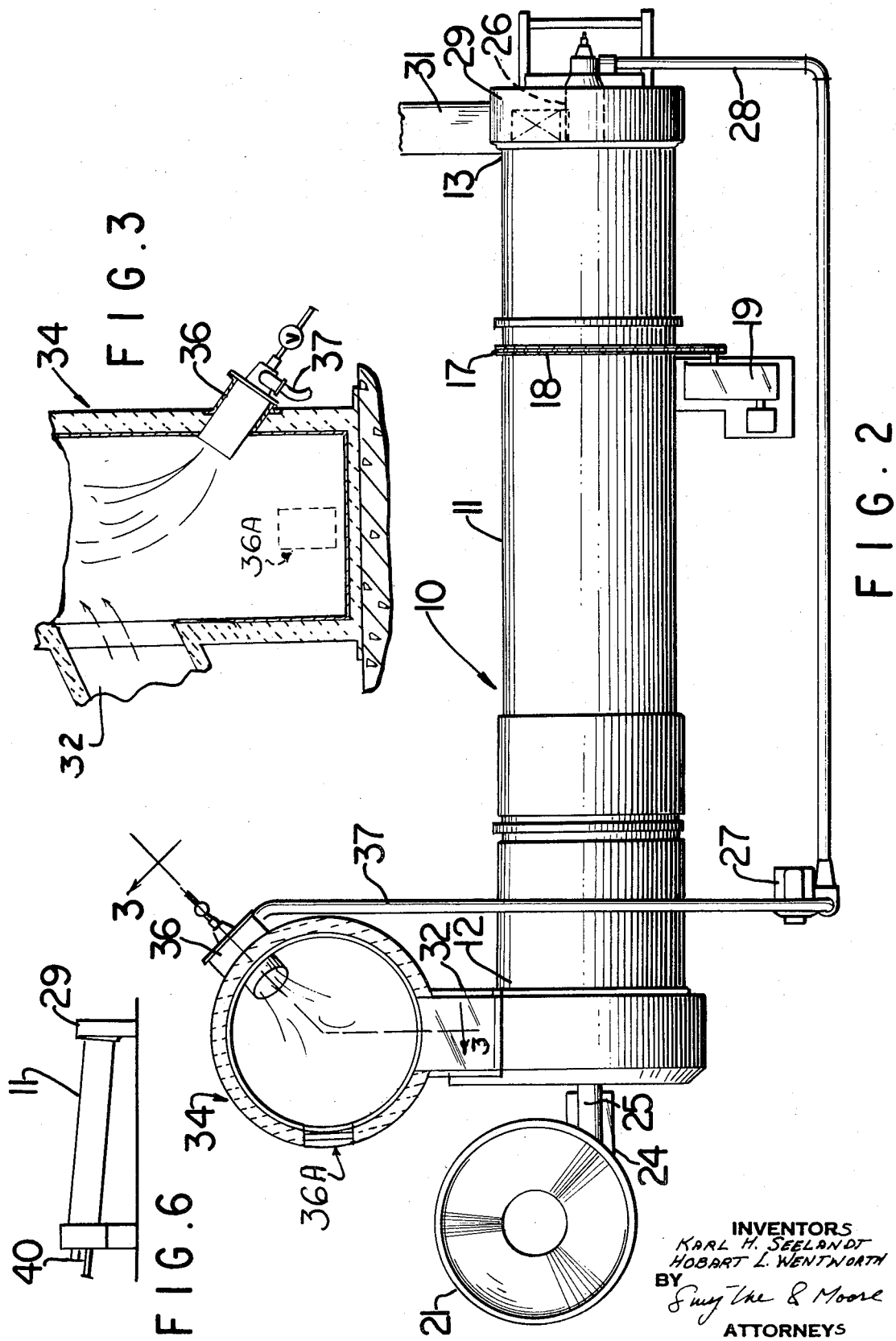

INTERNALLY HEATED ROTARY DRUM FURNACE WITH SMOKE ABATER

This invention relates to treatment of metal scrap or swarf to dry the same.

It is a common practice to process the metal scrap resulting from machining operations by removing the cutting oil and water therefrom to prepare the scrap for re-use. This scrap comprises chips and turnings usually mixed with a soluble cutting oil. Various processes and apparatus have been proposed to remove the oil and water from the scrap. This is generally done by a drying process wherein the oil and water are volatilized and the vapors removed. Difficulties have been experienced in controlling the air passing through the drum drying the metal scrap. Under certain conditions, sufficient air exists within the drying drum so that combustion of the volatilized oil may occur within the drum. This is undesirable since such combustion may damage the material being dried or the drying equipment and also it is difficult to control any combustion within the drying drum. It also has been attempted to remove the smoke containing the volatilized material from the drying drum without upsetting the atmosphere in the stack through which the smoke is discharged.

One of the objects of the present invention is to provide an improved apparatus for the drying of metal scrap or swarf such as result from machining operations.

Another of the objects of the present invention is to provide a metal scrap drying apparatus which eliminates the problem of combustion occuring within the drying drum.

According to one aspect of the present invention, there is provided a dryer apparatus for metallic scrap which may comprise a cylindrical dryer drum rotatable about its longitudinal axis. The longitudinal axis may be slightly inclined. Metallic scrap is introduced into one end of the drum and burner means are mounted at the same or other end of the drum. Means which may comprise a vertical stack communicate with the scrap inlet end of the drum to permit the discharge of products of combustion flowing from the drum. In one form, the interior of the drum can be provided with means, in addition to the inclined axis aspect, for advancing the metallic scrap longitudinally therethrough. In one form, the discharge end of the drum is provided with a chute for discharging dried metallic scrap therefrom. Both the inlet and discharge means at both ends of the drum are provided with means for sealing the drum against the entry of air therein so that the amount of air or oxygen within the drum is insufficient for combustion therein of volatile substances from the scrap.

An afterburner may be combined with the dryer apparatus and may comprise a burner mounted within a vertical stack communicating with the inlet end of the dryer drum. Thus, the smoke and volatile substances are removed from the dryer drum and then subjected to combustion within the vertical stack to abate the quantity of smoke coming from the dryer apparatus. The afterburner, in the preferred form, uses gas or oil for the burner and is located ahead of the point where the volatile substances enter the stack.

Other objects, advantages and features of the present invention will become apparent from the accompanying description and drawings, which are merely exemplary.

In the drawings:

FIG. 1 is an overall elevational view, with portions thereof being cut away, of the dryer apparatus and smoke abater according to the present invention;

FIG. 2 is a top plan view of the apparatus shown in FIG. 1 with the smoke abater portion being shown in section;

FIG. 3 is a sectional view taken along the line 3—3 of FIG. 2 and showing the afterburner for the smoke abater;

FIG. 5 is a sectional view taken along the line 5—5 of FIG. 4; and

FIG. 6 is a schematic view showing an alternate form.

Proceeding next to the drawings wherein like reference symbols indicate the same parts in the various views, a specific embodiment of the present invention will be described in detail.

Figure 4:
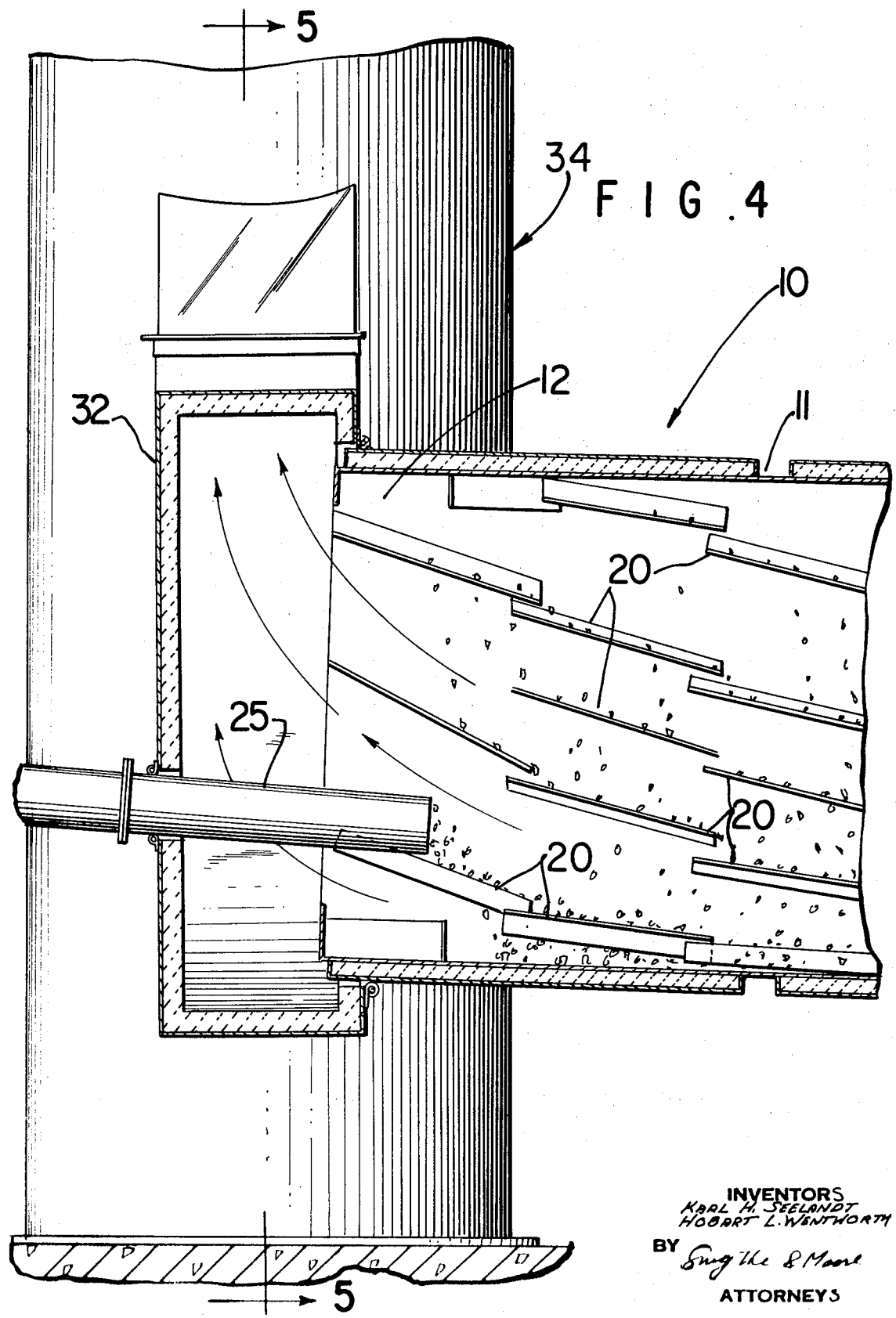
FIG. 4 is an enlarged scale vertical sectional view of the inlet end of the dryer drum of FIG. 1 and showing the flights within the drum for longitudinally advancing the scrap therethrough.

The metal scrap dryer apparatus according to the present invention is indicated generally at 10 in FIG. 1 and comprises a cylindrical dryer drum 11 arranged at a slight angle to the horizontal plane and having a scrap inlet end 12, which is raised slightly, and a scrap discharge end 13. The drum 11 is mounted for rotation about its longitudinal axis by means of a pair of guide rings 14 positioned to ride on associated trunnion rolls 15 mounted on pedestals 16. The rotary movement of the drum 11 is achieved by means of a driving sprocket 17 mounted on the periphery of the drum and connected by means of a roller driving chain 18 to a drive sprocket mounted on the shaft of a driving motor 19 or similar prime mover device.

The drum 11 may comprise a double shell construction having insulation between the inner and outer shells for a portion of the length. The interior of the drum can be provided with a plurality of flights 20 which have the desired pitch (e.g., 6-inch pitch). The flights function to advance the scrap material longitudinally from the inlet end of the drum toward the discharge end thereof to assist flow of the scrap down the inclined drum and to promote circulation of products of combustion around the scrap particles.

The metal scrap, which is generally crushed before being dried, is dumped into a storage hopper 21 provided with a rotary feeding table 22 at its lower or discharge end in order to meter the scrap material at an approximately constant rate through a chute 23 onto a vibrator conveyor 24. The chute 23 is sealed to prevent the entry of air therethrough and into the drum. The conveyor 24 moves the scrap into a tubular enclosure 25 which extends into the inlet end 12 of the drum and discharges the scrap within the drum.

The scrap within the drum is picked up by flights 20 and advanced longitudinally through the drum toward the discharge end 13.

A gas or oil burner 26 can be mounted within the discharge end of the drum which is supplied with air from an air blower 27 through pipe 28.

A discharge housing 29 is mounted over the discharge end 13 of the drum and is provided with an inclined discharge chute 30 which discharges the dried scrap onto a conveyor 31. The discharge chute 30 also is sealed with a gravity operated damper suitable closure 31A so that air is prevented from entering through the chute into the drum. Thus, substantially the only air introduced into the drum is that provided to the burner by the air blower, and the quantity of this air is kept sufficient only for combustion at the burner. As a result, the oil and water will be volatilized within the drum by the gas burner without the danger of excessive oxidation of metals or volatiles within the drum.

The inlet end 12 of drum 11 is provided with a breech connection 32 having a damper 33 therein which may be actuated by a pressure responsive controller so as to limit the amount of suction to which the drum 11 is subjected.

The breech connection 32 permits the products of combustion from the drum to be discharged into an after-burner or smoke abater 34 comprising a vertical stack 35 and a gas or oil burner 36 mounted as shown in FIG. 3. The burner 36 is similarly provided with air for combustion through the air blower 27 through pipe 37. Vertical stack 35 creates a draft within the drum 11 with the draft being controlled by the damper 33 (FIG. 5). The use of a vertical stack facilitates connection to a vertical downdraft scrubber in the event that it is desired to water or liquid scrub particulate matter with water sprays. A water spray 38 is provided at the inlet end of drum 11 to assist in controlling temperature of the products of combustion and volatilized matter leaving the dryer drum.

The temperature within the drum may first be lowered by throttling back the oil burner 26 or by stopping the feeding of metal scrap into the dryer drum. When the oil burner output is reduced to its lower limit and the temperature within the drum is still too high, water spray 38 may be actuated. Should the spray be insufficient to lower the temperature, the feeding of metal scrap into the drum then can be reduced or stopped.

The diameter of the stack 35 is relatively large so as to slow down the speed of carbon particles therein so that the particles may be burned within the stack by the afterburner. If the speed at which the particles travel upwardly through the vertical stack is too great, the particles will pass through the stack without burning. By constructing the vertical stack as illustrated and described herein, the particles of smoke are retained therein a sufficient length of time so as to be subjected to complete combustion, and thus, abatement of the smoke from the dryer apparatus is achieved. The vertical stack 35 is lined with insulation similar to that of a furnace. Burner 26 is preferably a gas burner and is located ahead of the point of entry of the volatile gases so that burner products of combustion and heat thereof each the incoming drum products of combustion and volatile carbon particles as they enter the stack. A manually operated air damper 36A can be used. In an alternate form, as shown in FIG. 6, the burner 40 can be at the swarf inlet end.

Thus, it can be seen that in the dryer apparatus, according to the present invention, the metal scrap soaked with cutting oil or water is moved into contact with the flame of the burner within the dru. Both ends of the drum are sealed against the entry of air therein so that the quantity of air within the drum is insufficient for combustion therein. Combustion air is supplied to the burner only is sufficient amounts for operation of the burner. All the products of combustion and the volatilized material are discharged from the dryer drum into a vertical stack where they are burnt. The burning of the material in the stack effectively abates the quantity of smoke coming from the dryer apparatus.

It will be understood that various details of construction and arrangement of parts may be made without departing from the spirit of the invention except as defined in the appended claims.

What is claimed is:

1. A dryer apparatus for swarf comprising a cylindrical dryer drum, means mounting said cylindrical drum for rotation about its longitudinal axis, inlet means at one end of said drum for introducing therein swarf which is to be dried, burner means at one end of said drum, means at the inlet end of said drum to permit the discharge of products of combustion flowing through the drum from the burner to the inlet end, means at the end of said drum opposite said inlet end for discharging the swarf therefrom, means for spraying water into the swarf at the inlet end of said drum, and means at said inlet means and said discharge means for sealing both means respectively against the entry of air into the drum so that the amount of air within the drum is insufficient for combustion therein of the volatile substances from the swarf.

2. A dryer apparatus as claimed in claim 1 where the burner is at the discharge end and the products of combustion therefrom are in counterflow relation with the swarf.

3. A dryer apparatus as claimed in claim 1 wherein said combustion product discharge means comprises a vertical stack communicating with said drum at the inlet end thereof.

4. A dryer apparatus as claimed in claim 3 wherein said vertical stack is positioned laterally of said drum.

5. A dryer apparatus as claimed in claim 4 and comprising a breech connector between the inlet end of said drum and said stack and inclined upwardly to direct the products of combustion at an upward angle into said stack.

6. A dryer apparatus as claimed in claim 5 and comprising a damper within said breech connection.

7. A dryer apparatus as claimed in claim 6 and comprising means responsive to the pressure within said drum for actuating said damper to control the suction within the drum.

8. A dryer apparatus as claimed in claim 1 and comprising afterburner means at the combustion products discharge end of the drum.

9. A dryer apparatus as claimed in claim 5 and comprising an afterburner within said stack at the outlet of said breech connection to burn the products of combustion entering the stack.

10. A dryer apparatus as claimed in claim 1 wherein an afterburner is directed upwardly within said stack at the products of combustion being discharged from said breech connection and is ahead thereof.

11. A dryer apparatus for swarf comprising a cylindrical dryer drum, means mounting said cylindrical drum for rotation about its longitudinal axis, inlet means at one end of said drum for introducing therein swarf which is to be dried, burner means at one end of said drum, stack means adjacent said inlet end of said drum to permit the discharge of products of combustion flowing through the drum from the burner to the inlet end, a breech connector between the inlet end of said drum and said stack and a damper within said breech connection, means at the end of said drum opposite said inlet end for discharging the swarf therefrom, and means at said inlet means and said discharge means for sealing both means respectively against the entry of air into the drum so that the amount of air within the drum is insufficient for combustion therein of the volatile substances separated from the swarf.

12. A dryer apparatus as claimed in claim 11 comprising means responsive to the pressure within said drum for actuating said damper to control the suction within the drum.

13. A process for the drying of swarf which comprises introducing swarf at the inlet end of an airtight inclined rotating drying drum, applying controlled heat to said swarf to volatize liquids mixed with said swarf, controlling the quantity of air and temperature within the drum so that it is insufficient for combustion of the swarf and the substances volatized therefrom, discharging the volatized substances into a stack for complete combustion therein, and discharging the dried swarf at the outlet end of said rotating drum.

14. A process according to claim 12 wherein water is sprayed into the swarf to lower the temperature thereof.

* * * * *